(12) United States Patent
Krutsch et al.

(10) Patent No.: US 11,272,251 B2
(45) Date of Patent: Mar. 8, 2022

(54) AUDIO-VISUAL PORTION GENERATION FROM A LIVE VIDEO STREAM

(71) Applicant: See A Star LLC, Wayzata, MN (US)

(72) Inventors: Kenneth F. Krutsch, Minnetonka, MN (US); Emma C. Aversa, Minneapolis, MN (US)

(73) Assignee: See A Star LLC, Wayzata, MN (US)

( * ) Notice: Subject to any disclaimer, the term of this patent is extended or adjusted under 35 U.S.C. 154(b) by 0 days.

(21) Appl. No.: 16/862,339

(22) Filed: Apr. 29, 2020

(65) Prior Publication Data

US 2020/0344501 A1 Oct. 29, 2020

Related U.S. Application Data

(60) Provisional application No. 62/839,865, filed on Apr. 29, 2019.

(51) Int. Cl.
*H04N 7/16* (2011.01)
*H04N 21/454* (2011.01)
(Continued)

(52) U.S. Cl.
CPC ..... *H04N 21/4542* (2013.01); *G06F 16/9566* (2019.01); *G06F 21/602* (2013.01); *G06Q 20/127* (2013.01); *G06Q 30/08* (2013.01); *H04L 65/1069* (2013.01); *H04L 67/02* (2013.01); *H04L 67/325* (2013.01); *H04N 7/15* (2013.01); *H04N 21/2365* (2013.01); *H04N 21/2368* (2013.01); *H04N 21/2389* (2013.01); *H04N 21/258* (2013.01); *H04N 21/2743* (2013.01); *H04N 21/44236* (2013.01); *H04N 21/45* (2013.01); *H04N 21/4532* (2013.01);

(Continued)

(58) Field of Classification Search
CPC ......... H04N 21/4542; H04N 21/44236; H04N 21/45; H04N 21/258; H04N 21/4788; H04N 21/4756; H04N 21/466; H04N 21/4532; H04N 21/2743; H04N 21/835; H04N 21/854; H04N 21/2368; H04N 21/2389; H04N 21/2365
USPC ........................................................ 725/148
See application file for complete search history.

(56) References Cited

U.S. PATENT DOCUMENTS

| | | | | |
|---|---|---|---|---|
| 5,790,180 A | * | 8/1998 | Wild .................... | H04N 7/002 348/14.04 |
| 5,914,712 A | * | 6/1999 | Sartain ............... | H04N 7/17354 725/9 |

(Continued)

*Primary Examiner* — Michael B. Pierorazio
(74) *Attorney, Agent, or Firm* — Forsgren Fisher; Daniel A. Tysver; James M. Urzedowski (57) ABSTRACT

A system and method are presented for sharing an audio-visual stream from a server system with a plurality of participant computer systems and for the automated generation of portions. Each participant computer system provides audio and visual data which is converted into the audio-visual stream by the server system. The server system then shares the audio-visual stream with the participant computer systems. During the audio-visual stream, a participant computer can request a portion at a time T. The server will automatically generate a portion audio-visual file using audio and visual data from the stream extending from before time T to after time T. After creation of the portion, the participant computer can modify the timing of the portion and can modify the visual presentation of the portion.

20 Claims, 6 Drawing Sheets

(51) Int. Cl.
*H04N 21/2368* (2011.01)
*H04N 21/2389* (2011.01)
*H04N 21/2365* (2011.01)
*G06F 21/60* (2013.01)
*H04N 21/835* (2011.01)
*H04N 21/854* (2011.01)
*G06F 16/955* (2019.01)
*G06Q 20/12* (2012.01)
*G06Q 30/08* (2012.01)
*H04L 65/1069* (2022.01)
*H04L 67/02* (2022.01)
*H04L 67/62* (2022.01)
*H04N 7/15* (2006.01)
*H04N 21/442* (2011.01)
*H04N 21/45* (2011.01)
*H04N 21/258* (2011.01)
*H04N 21/4788* (2011.01)
*H04N 21/475* (2011.01)
*H04N 21/466* (2011.01)
*H04N 21/2743* (2011.01)
*G06Q 50/00* (2012.01)

(52) U.S. Cl.
CPC ....... *H04N 21/466* (2013.01); *H04N 21/4756* (2013.01); *H04N 21/4788* (2013.01); *H04N 21/835* (2013.01); *H04N 21/854* (2013.01); *G06Q 50/01* (2013.01)

(56) References Cited

U.S. PATENT DOCUMENTS

| | | | | |
|---|---|---|---|---|
| 5,980,447 A * | 11/1999 | Trudeau | | A61B 5/00 600/3 |
| 6,029,195 A * | 2/2000 | Herz | | G06Q 30/02 725/116 |
| 6,124,854 A * | 9/2000 | Sartain | | H04N 5/44543 715/716 |
| 6,411,605 B1 * | 6/2002 | Vance | | H04L 41/00 370/261 |
| 6,978,002 B1 * | 12/2005 | Cope | | H04M 3/56 370/260 |
| 9,979,757 B1 * | 5/2018 | Greenspan | | H04L 65/1093 |
| 10,419,511 B1 * | 9/2019 | Yuan | | H04L 65/403 |
| 10,567,450 B1 * | 2/2020 | Gopal | | H04L 12/1822 |
| 11,012,481 B2 * | 5/2021 | Gopal | | H04L 65/1083 |
| 2001/0005834 A1 * | 6/2001 | Simpson | | G11B 23/40 705/26.1 |
| 2006/0080710 A1 * | 4/2006 | Carthern | | H04M 1/72415 725/47 |
| 2006/0167774 A1 * | 7/2006 | Zucker | | H04M 15/51 705/35 |
| 2006/0244812 A1 * | 11/2006 | Jeong | | H04N 7/147 348/14.1 |
| 2006/0287105 A1 * | 12/2006 | Willis | | G07F 17/323 463/42 |
| 2007/0136739 A1 * | 6/2007 | Watson | | H04N 21/2543 725/9 |
| 2008/0075245 A1 * | 3/2008 | Pearson | | H04W 12/08 379/88.13 |
| 2008/0102952 A1 * | 5/2008 | Walker | | G07F 17/3255 463/34 |
| 2008/0147741 A1 * | 6/2008 | Gonen | | G16H 10/60 |
| 2008/0266379 A1 * | 10/2008 | Hubenthal | | H04N 7/181 348/14.08 |
| 2008/0288870 A1 * | 11/2008 | Zheng | | H04L 65/403 715/719 |
| 2008/0288989 A1 * | 11/2008 | Zheng | | H04N 7/147 725/92 |
| 2009/0115843 A1 * | 5/2009 | Sohmers | | H04N 7/173 348/61 |
| 2010/0152893 A1 * | 6/2010 | Fure | | H04M 15/00 700/237 |
| 2011/0103564 A1 * | 5/2011 | Couse | | H04M 3/387 379/201.03 |
| 2012/0066736 A1 * | 3/2012 | Labrador | | H04L 63/10 726/1 |
| 2013/0083156 A1 * | 4/2013 | Forkner | | H04N 7/152 348/14.08 |
| 2014/0044242 A1 * | 2/2014 | Hodge | | H04M 17/02 379/68 |
| 2015/0095433 A1 * | 4/2015 | Grossman | | G11B 27/329 709/206 |
| 2015/0201081 A1 * | 7/2015 | Hodge | | H04M 17/02 379/88.12 |
| 2015/0222670 A1 * | 8/2015 | Inoue | | H04L 65/4038 370/261 |
| 2016/0006981 A1 * | 1/2016 | Bauman | | H04N 7/147 705/26.3 |
| 2016/0142361 A1 * | 5/2016 | Grossman | | H04W 4/21 709/206 |
| 2016/0285928 A1 * | 9/2016 | Sanso | | G06F 40/166 |
| 2017/0069047 A1 * | 3/2017 | Joao | | G06Q 10/00 |
| 2017/0353508 A1 | 12/2017 | Yoakum | | |
| 2017/0374118 A1 * | 12/2017 | Pevzner | | H04L 65/4092 |
| 2018/0140502 A1 * | 5/2018 | Shahoian | | A61H 19/44 |
| 2018/0204576 A1 * | 7/2018 | Dhoot | | G10L 17/00 |
| 2019/0251493 A1 * | 8/2019 | Wilde | | G06Q 50/01 |
| 2020/0186576 A1 * | 6/2020 | Gopal | | H04L 65/1083 |

\* cited by examiner

Luminary Portion

Figure 9

User Portion

AUDIO-VISUAL PORTION GENERATION FROM A LIVE VIDEO STREAM

CROSS-REFERENCE TO RELATED CASES

This application claims the benefit of U.S. Provisional Patent Application No. 62/839,865, filed Apr. 29, 2019. This provisional application is hereby incorporated by reference in its entirety.

FIELD OF THE INVENTION

The present invention involves the field of audio-visual stream and file manipulation. More particularly, the present invention relates to the identification, creation, and modification of customized portions of an audio-visual stream for multiple members of a multi-party video stream.

DETAILED DESCRIPTION

System 10

Figure 1:
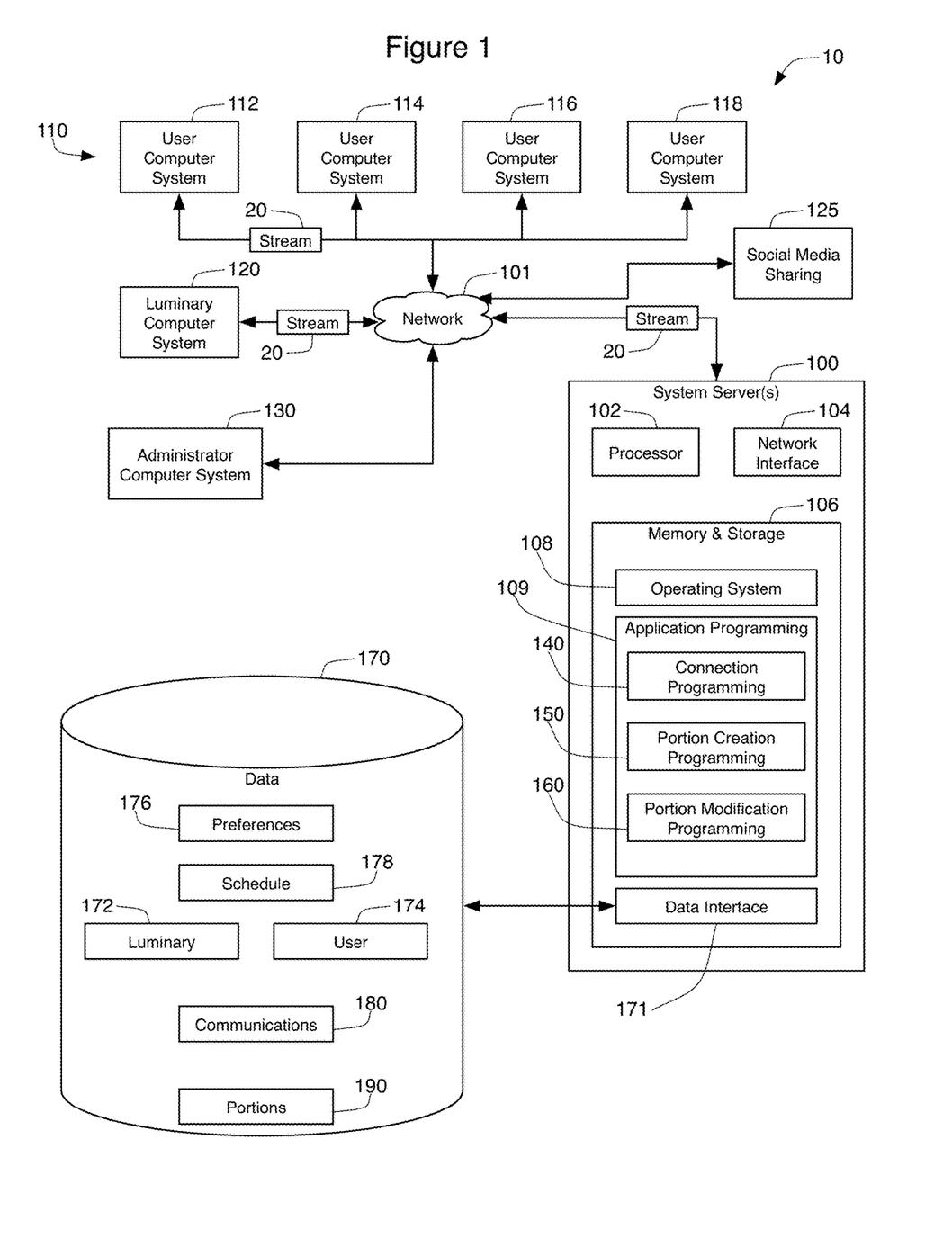
FIG. 1 is a schematic view of a system for providing a multi-party video stream and the creation of individualized portions.

FIG. 1 shows a system 10 for the creation of a multi-party video stream 20 and for the identification, generation, modification, and sharing of portions of that video stream 20. The system 10 relies upon the presence of at least one system server 100. The server 100 communicates over a computer network 101 with one or more user computers systems 110 and a luminary computer system 120. More particularly, four user computer systems 110 are shown in FIG. 1, which are referenced using figure numbers 112, 114, 116, and 118. In an actual embodiment, many more user computer systems 110 would form part of system 10. Similarly, even though only a single luminary computer system 120 is shown, it is expected that an actual embodiment of system 10 will connect with a large plurality of luminary computer systems 120. Finally, although only a single device is shown as system server 100 in FIG. 1, it is well known to establish a plurality of server computer devices on a network 101 that operate together as a single server system 100. Thus, the use of a single computing device as the system server 100 is merely illustrative for describing the functionality of the present invention. In some embodiments, the operation of the system server 110 and the overall system 10 can be controlled through an administrative computer system 130.

Because all of the devices 100, 110, 120, 130 are computing devices, each of these devices 100, 110, 120, 130 includes a processor 102 for processing computer programming instructions. This is true even though FIG. 1 only shows processor 102 inside the system server 100. In most cases, the processor 102 is a CPU, such as the CPU devices created by Intel Corporation (Santa Clara, Calif.), Advanced Micro Devices, Inc (Santa Clara, Calif.), or a RISC processer produced according to the designs of Arm Holdings PLC (Cambridge, England). The computing devices 100, 110, 120, 130 will also have a network interface 104 that allows for communications with each other over network 101. When the network 101 is the Internet, the network interfaces 104 will be capable of communicating over a TCP/IP communications protocol. Other networks 101 are possible for use in the system 10.

The purpose of the system 10 is to generate a live video stream 20 between the luminary computer system 120 and at least one of the user computer systems 110. In at least one embodiment, the live video stream 20 exists between the luminary computer system 120 and multiple user computer systems 110, such as all four of the user computer systems 112, 114, 116, 118 shown in FIG. 1. The generated video stream 20 includes both visual and audio elements, and therefore can be considered an audio-visual stream 20. In one embodiment, the video stream 20 takes the form of a video conference stream. In a video conference stream 20, each of the various computer systems 110, 120 provide both audio and video data for the video stream 20. The system server 100 receives audio and video data from each of the participating computer systems 110, 120 and then generates a video stream 20 that combines the data it received in a manner that is useful and/or entertaining. The system server 100 generates this video stream 20 and shares it in real time with the various computer systems 110, 120 that are participating in the video stream 20.

In one embodiment, computer system 120 is operated by a luminary. A luminary is an individual of some fame or expertise such that users would be interested in communicating with the luminary. For example, the luminary may be a sports star, a movie star, a famous musician, a business leader, an academician, or some other celebrity. Using the luminary computer system 120, the luminary may communicate with the system server 100, input background information about themselves, and express a willingness to engage in multi-party video streams with a variety of users in exchange for compensation. Users on the user computers 110 can review information concerning various luminaries that have registered with the system server 100 and request a shared video stream 20 with a particular luminary. Users will generally pay consideration to participate in the stream 20 with the luminary.

Each of the computing systems 100, 110, 120, 130 has a memory 106 containing programming and data that assists in the creation of these video streams. In FIG. 1, the memory 106 is shown only in the system server 100. The memory 106 generally takes the form of both temporary, random access memory (RAM) and more permanent storage such a magnetic disk storage, FLASH memory, or another non-transitory (also referred to as permanent) storage medium. The programming and data will be stored permanently on non-transitory storage devices and transferred into RAM when needed for processing or analysis. In all computing devices 100, 110, 120, 130 the memory 106 contains an operating system 108 responsible for the general operation of the computing devices 100, 110, 120, 130 and proper operation of the application programming 109 that is also stored in the memory 106.

In the user computer systems 110 and the luminary computer system 120, the application programming 109 can take the form of a simple browser program that receives and transmits web-based data with the system server 100. In this embodiment, the system server 100 is completely responsible for creating the user interface shown by the browsers on the connected computing systems 110, 120. In other embodiments, the connected computing systems 110, 120 run specialty application programming 109 that communicates over the network 101 with the system server 100. The specialty application programming 109 can include programming to create large portions of the user interface used by these computing systems 110, 120. The application programming on these devices 110, 120 submits to the system server 100 audio and visual information received from microphones and cameras on or connected to the devices 110, 120. The application programming 109 on the server 100 then generates the audio-visual stream 20 based on this data. The stream 20 is received by the application programming on the devices 110, 120, and then inserted into the user interface created by that programming.

In still other embodiments, one, several, or all of the user computer systems 110 and the luminary computer system 120 are mobile devices such as tablet computers or smart phones. These devices 110, 120 generally use ARM-based RISC processors 102, run mobile device operating systems 108, and utilize "apps" downloaded from an app store as their application programming 109. In these cases, the application programming 109 can still either take the form of a browser app or a specialty application app that is responsible in part for forming the user interface show by the devices 110, 120.

In the system server 100, the application programming 109 is divided into three main components 140, 150, 160. This division is illustrative only, as there is no requirement that the application programming 109 for the system server 100 be physically or even functionally separated into these three divisions 140, 150, 160. The first of these components is connection programming 140. Connection programming 140 is responsible for creating and operating the multi-party video stream 20. In particular, connection programming 140 determines which user computer systems 110 will be included with the luminary computer system 120 in the stream 20, ensures that all of the connected computers 110, 120 are transmitting audio and visual data to the system server 100, uses the received audio and visual data to create the multi-party video stream 20, and then transmits the multi-party video stream 20 to the connected user computers systems 110 and the luminary computer system 120. The connection programming 140 is also responsible for receiving inputs from the user interfaces provided on the connected devices 110, 120, and adjusting the content of the multi-party video stream 20 as appropriate. For example, a user may wish to see the visual of all of the participants of the multi-party video stream 20 simultaneously and at equal size, while another user may wish to see only the visual data provided by the participant that is currently speaking. These features are provided by the connection programming 140, or by the connection programming 140 working in concert with specialty application programming on the user and luminary computer systems 110, 120. Furthermore, the connection programming 140 may be responsible for generating a stored, audio-video file containing the content of the entire multi-party video stream 20.

Creating Stored Portions

The portion creation programming 150 is responsible for receiving requests for the creation of stored portions of the audio-visual stream 20. To perform this function, the portion creation programming 150 first receives a signal from either the luminary computer system 120 or one of the user computer systems 110. This signal indicates that a participant would like to store the current portion of the stream 20 for later retrieval and sharing. The signal may take the form of a "bookmark" signal, effectively allowing a participant to press a user interface button in order to store an interesting portion of the stream 20 that is occurring at that moment. Although this can be referred to as a bookmark, and the user interface can suggest that the user is requesting that a bookmark be created, the actually created portion is more than a simple bookmark of a location with the stream 20. Instead, the portion is a recorded sub-section of the material that constitutes the stream. In one embodiment, the portion creation programming 150 notes the timing of the received signal and ensures that the audio and video components of the stream 20 surrounding this temporal location are stored for later retrieval. In other embodiments, the components that make up the stream 20 are always stored so that the creation of the portion can occur based on these stored components.

The portions created by programming 150 can be reviewed by the requesting luminary computer system 120 or user computer system 110 after the stream 20 is complete. These portions may be considered private to the requesting computer system 110, 120, in that only the requesting computer system 110, 120 may access that portion. In some embodiments, programming 150 further provides linkages to a social media sharing server 125. A user or luminary can provide to the system server 100 their account information for social media site 125 and then request that the portion creation programming 150 share the created portion on their account on site 125.

Portion modification programming 160 is provides the requesting luminary computer system 120 or user computer system 110 the ability to modify their stored portions. The process for modifying a stored portion is described in further detail below.

The last of the programming stored in memory 106 is the data interface 171. This interface programming 171 allows the system server 100 and the application programming 109 to access, manage, modify, and create stored data 170. The stored data 170 can be stored on the same computer device as the system server 100. Alternatively, the data 170 can be stored on attached storage, or on a storage area network on which the system server(s) 100 reside. In still further embodiments, the data 170 is managed by a separate computer system that is accessible to the system server 100, such as over a local area network, a wide area network, or some type of direct communication. The data 170 itself can be stored in a structured database in the form of objects in an object-oriented database or within tables in a relational database. In still further embodiments, the data 170 is organized in a data store utilizing a known format such as key value pairs or tuples. In the present description, the data 170 will be described as being divided into separate data entities 172-190 which may take the form of a table or object. This description is illustrative of the type of data being stored and the relationship between the data. Unless otherwise specifically stated in the claims, there is no requirement, that the data 170 be separated into the specific data entities 172-190 described herein.

Figure 2:
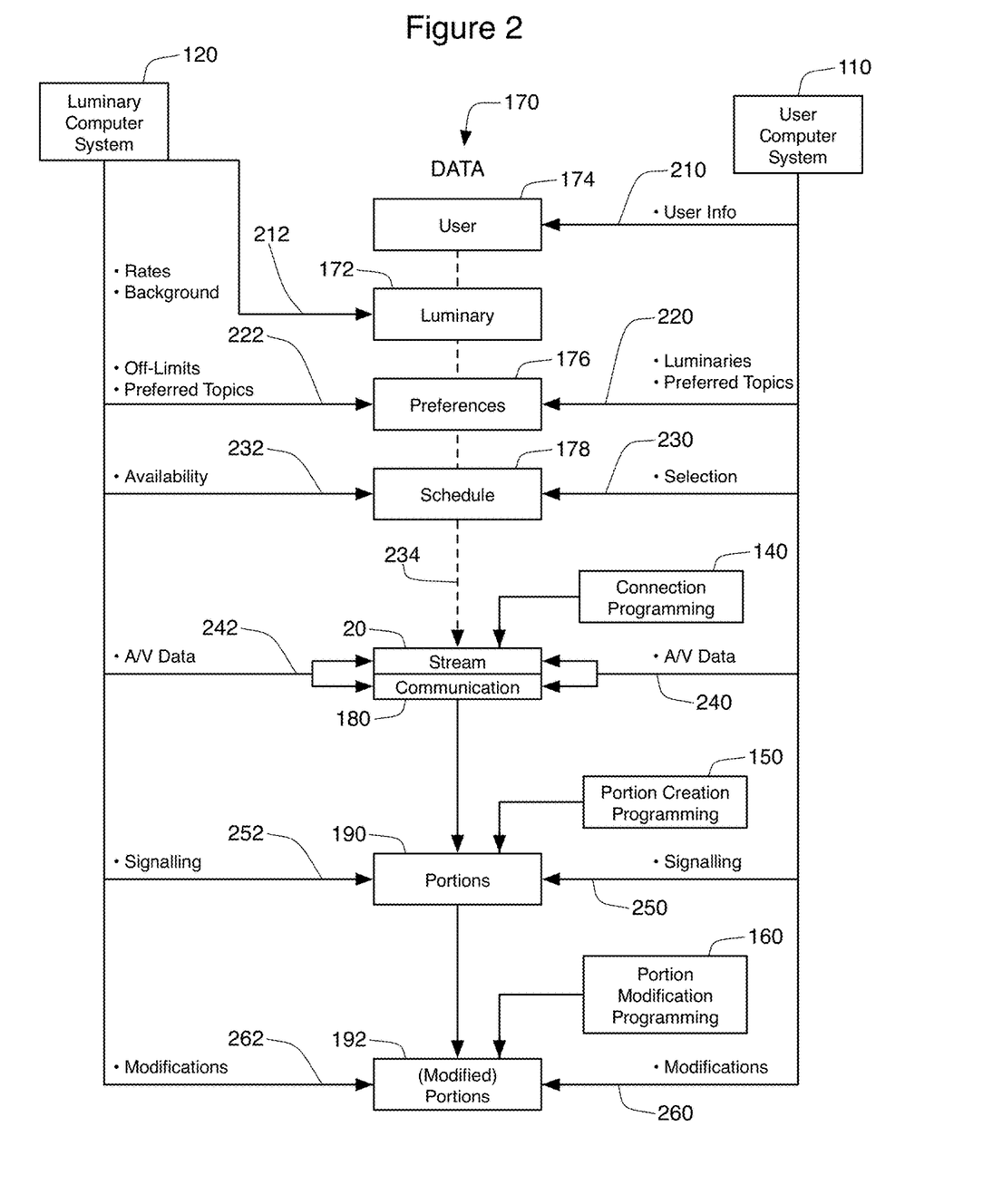
FIG. 2 is a schematic view of the use of the data from FIG. 1 for the generation and modification of portions.

FIG. 2 shows these same data entities 172-190 along with the signals and data elements that are stored in these entities. The luminary entity 172 and the user entity 174 store data associated with the participant using the luminary computer system 120 and the participant using the user computer system 110, respectively. In particular, information about the user 210 can be received from the user computer system 110 during the on-boarding process of the user creating an account for use of the system 10. This user information 210 is then stored in user data entity 174. Similarly, the luminary computer system 120 provides luminary information 212 for data entity 172. This can include background information about the luminary that will remind users of the luminary's accomplishments. This data 212 can also include rate information that the luminary specifies that they wish to charge users to engagement in a live audio-video stream 20.

Data 170 also includes a separate preferences data entity 176 that stores the preferences of the various users and luminaries. Users may indicate a preference 220 for particular luminaries, or particular types of luminaries (opera stars, players from particular sports teams, etc.), as well as preferred topics of discussion (such as writing tips provided by author luminaries, or fantasy sports tips provided by sports stars). Luminaries can also provide preference data 222 concerning preferred topics of discussion. In some embodiments, the luminaries can provide preferences 222 concerning off-limit or black-listed topics (such as romantic relationships or money).

In order to link the user computers 110 with the luminary computer system 120, scheduling data 178 must also be maintained and shared. The luminary computer systems 120 provide availability data 232 that can be shared with user computer systems 110, while a user computer system 110 provides selection information 230 in order to select one of the identified times in the availability data 232 for the stream 20 to occur.

Figure 3:
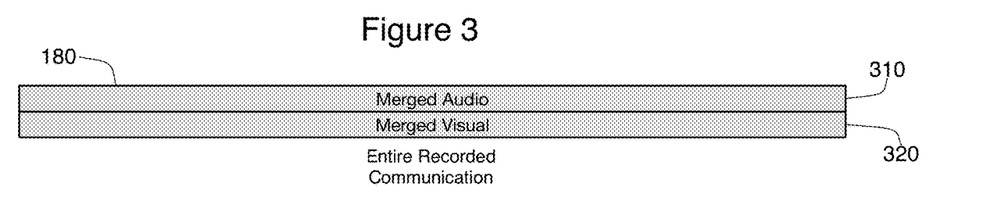
FIG. 3 is a schematic view of a recorded communication.

When the scheduled stream 20 goes live, the system server 100 receives audio and visual data 240 from each of the user computer systems 110 participating in the stream 20 and also receives similar data 242 from the luminary computer system 120. This data 240, 242 is used by the connection programming 140 to create the audio-visual stream 20 that is shared with the participating computing devices 110, 120. In addition, some embodiments of the server system 100 also use this same data 240, 242 and store the data as a single communication data item 180. This communication data entity 180 stores the entire content of the audio-visual stream 20. This content is stored as an audio-visual file using a standard video codec (such as H.264) and a standard audio codec (such as AAC) in a container file (such as MP4). In some embodiments, as shown in FIG. 3, the audio-visual file 180 contains a single audio element 310 and a single visual element 320 that combines the audio-visual data 240, 242 received from the participating computing devices 110, 120 into a single audio-visual (or video) file 180. In this embodiment, the separate visual elements from the received data 240, 242 can be combined using a standard merging process, such as by presenting each visual element (the faces of the participants) in equally sized windows. Alternatively, the merged visuals 320 may emphasize the currently speaking participant in a larger window than the data received from non-speaking participants.

In other embodiments, all of the video data 240, 242 received from the participating computer devices 110, 120 are separately stored as part of the communications data entity 180, so that they can be recombined as desired by the participants at a later time. The audio may still be formed as a single, merged "track" of audio data, but separate visual "tracks" may separately store the visual data received from each of the participating computer systems 110, 120.

During the stream 20, the portion creation programming 150 monitors inputs from the user interfaces created by the user computer system 110 and the luminary computer system 120 for a signal 250, 252 indicating a desire to create a portion 190 of the video stream 20. These signals 250, 252 and the creation of the portion 190 are shown in more detail in FIGS. 4, 5, and 6.

Figure 4:
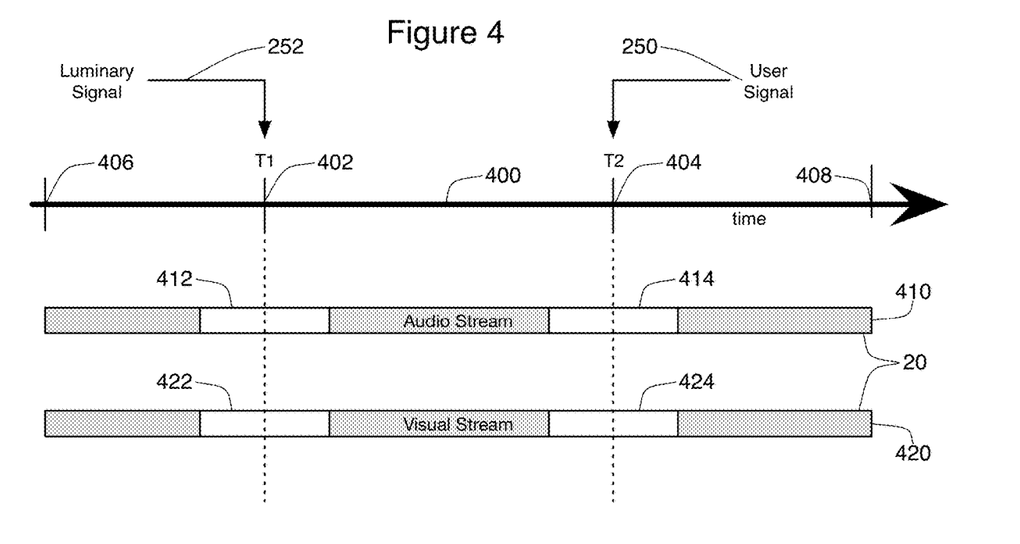
FIG. 4 is a schematic view of a timeline, audio stream, video stream, and two portioning signals.

FIG. 4 shows a timeline 400 in which time passes from left to right. Time T1 402 occurs to the left of time T2 404 on the timeline 400, and therefore time T1 402 occurs before time 404. At time T1 402, the system server 100 receives from the luminary computer 120 a signal 252 indicating a desire to save a portion 190 of the audio-visual stream 20. The audio-visual stream 20 in this embodiment consists of an audio stream 410 and a single visual stream 420. Remembering that the luminary computer system 120 in at least one embodiment presents to the participant using that computer system 120 the ability to alter the visual presentation of the stream 20 so as to emphasize and change the sizes of different video sources provided to the stream 20. For instance, the visual presentation of the stream 20 may change to present only the currently speaking participant of the video stream 20 on the entire visual interface. Alternatively, all participants in the stream 20 may be shown at different locations on the presented visual interface at equal sizes. Consequently, the single visual stream 420 of FIG. 4 may be the video portion of the stream 20 currently being presented on the luminary computer system 120. Alternatively, the single visual stream 420 of FIG. 4 may be an aggregate visual stream 420 created by the system server 100 specifically for the purposes of creating luminary portions 190. In this alternative, each participant can alter their visual presentation as they desire during the stream 20, but all stored portions 190 will use the aggregate visual stream 420 created by the system server 100 for this purpose.

Figure 5:
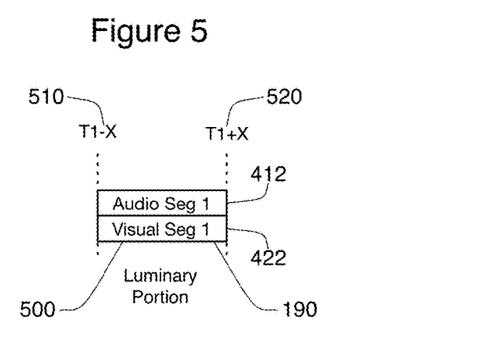
FIG. 5 is a schematic view of a first audio-visual portion.

At time T1 402, the portion creation programming 150 of the system server 100 receives the luminary signal 252 indicating a desire to save a portion 190 (aka the bookmark signal). When the signal 252 is received, portion creation programming 150 identifies a portion 412 of the audio stream 410 and a portion 422 of the visual stream 420 for use in creation the saved portion 190 of the stream 20. The specific portion 500 created as a result of signal 252 is shown in FIG. 5. As can be seen, the portion 500 created for the luminary computer system 120 consists of the audio segment 412 ("Audio Seg 1") and the visual segment 422 ("Visual Seg 1") combined into a single video file 500. Each of these segments 412, 422 are created based on the time T1 402 at which the luminary signal 252 is received. In one embodiment, the beginning of each segment occurs at a predetermined amount of time (X) before T1 (time 510), while the end of each segment 412, 414 occurs at the same predetermined time (X) after T1 (time 520). In some embodiments, X is 15 seconds. In other embodiments X is longer than 15 seconds (such as 30 seconds) or is shorter than 15 seconds. In yet other embodiments, the predetermined time used for times 510, 520 differs, such that the beginning time 510 is further or closer to the signal time T1 402 than the ending time 520.

As can be seen by the white areas representing segments 412, 422 in FIG. 4, the beginning time 510 of portion 500 occurs after time 406 when the entire stream 20 starts, while ending time 520 occurs before time 408 when the stream 20 finishes. In other words, portion 500 does not extend either to the starting time 406 or the finishing time 408 of the stream 20.

Figure 6:
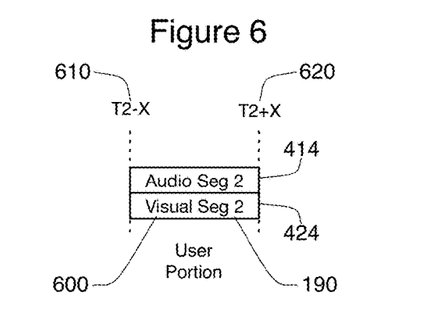
FIG. 6 is a schematic view of a second audio-visual portion.

At time T2 404, the portion creation programming 150 receives the user signal 250 from a user computer system 110. This triggers the programming 150 to create a second portion 190, namely the user portion 600 shown in FIG. 6. As shown in FIGS. 4 and 6, this portion 600 consists of Audio Seg 2 414 and Visual Seg 2 424 combined together into a video file. As was the case above, each of these segments 414, 424 may extend from a time that is the predetermined time X before T2 (time 610) until a time that is the predetermined time X after T2 (time 620). The two created portions 500, 600 are stored in the database 170 as portions 190.

This method for creating portions 190 allows a single action (transmitting signals 250, 252) to define portions 190 with a set beginning and ending time that are different from (but overlap) the time at which the actions (and transmitted signals) occur. In other words, the transmission of these signals 250, 252 is the only signal that needs to be received from the computer system 110, 120 in order to create a portion 190. No other signals related to the timing (when the portion 190 is taken from inside the stream 20) or duration (the time between the beginning and ending of the portion 190) is required. This is important because the signals 250, 252 are generated during the time that the stream 20 is being transmitted and received. Requiring multiple signals (turn on recording and turn off recording, etc.) would increase the amount of effort and concentration required by the participants, which would distract from the enjoyment of the stream 20 itself.

Luminaries and users can review the portions 190 that they create and share them on a social media sharing site 125 without any additional editing or definition. Thus, if a moment is occurring in the video stream 20 that a participant wants to remember, the participant simply presses a button on their respective user interface that transmits signal 250, 252, and the portion creation programming 150 will store a portion 190 of the stream 20 that contains that memorable moment in data 170 for later review and sharing.

Figure 7:
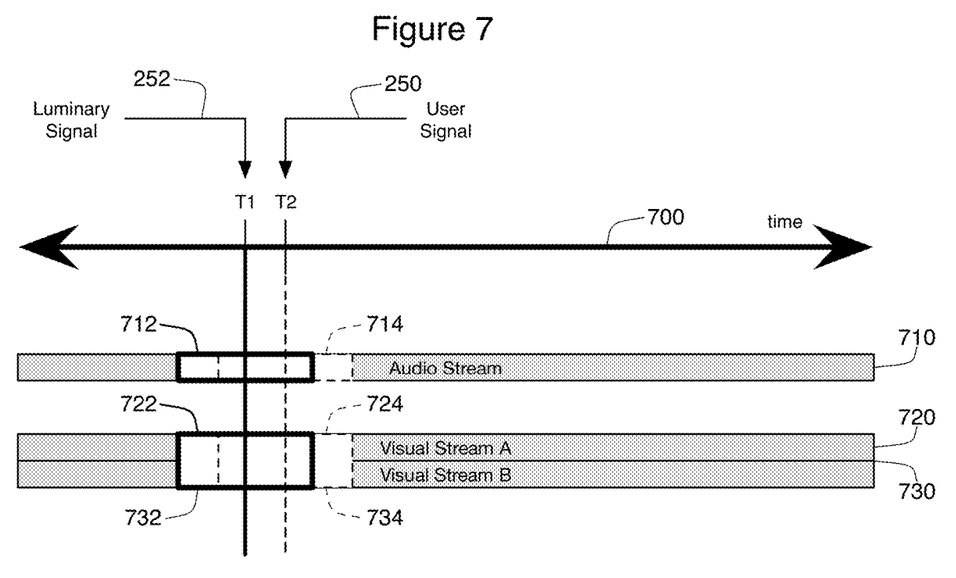
FIG. 7 is a schematic view of a timeline, audio stream, multiple video streams, and overlapping portioning signals.

FIG. 7 shows another embodiment of portion creation programming 150 that is able to store date from multiple visual streams. In particular, FIG. 7 shows that a portion 190 can be created storing information from an audio stream 710 and two visual streams, namely visual stream A 720 and visual stream B 730. These visual streams 720, 730 may originate at two different computing systems, such as luminary computer 120 and user computer 112. In the context of a multi-party video conferencing stream 20, each visual stream 720, 730 may contain the image of the face of a different participant in that stream 20. It is to be expected that more than two visual streams 720, 730 could be included. For instance, if five user computers 110 and one luminary 120 were participating in the stream 20, there would be six different visual streams included.

Figure 8:
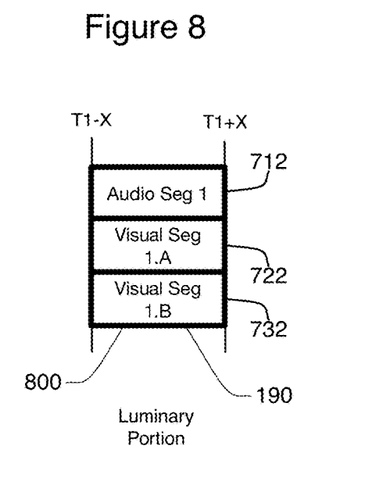
FIG. 8 is a schematic view of a third audio-visual portion.

In the context of FIG. 7, a luminary signal 252 is received at time T1 on timeline 700, while a user signal 250 is received at time T2. The portions 190 created by each of these signals 252, 250 will contain multiple visual segments. Specifically, one visual segment from each included visual stream 720, 730 will be included in each created portion 190. Thus, as shown in FIG. 8, the luminary portion 800 includes audio segment 1 712 from the audio stream 710, visual segment 1.A 722 from visual stream A 720, and visual segment 1.B 732 from visual stream B 730. As shown in FIG. 8, these segments 712, 722, 732 extend from a predetermined time X before time T1 (T1–X) to the predetermined time after time T1 (T1+X). Similarly, the created user portion 900 shown in FIG. 9 contains audio segment 2 714, visual segment 2.A 724 from visual stream A 720, and visual segment 2.B 734 from visual stream B 730. These segments 714, 724, 734 are selected using T2 (the time of receipt of the user signal 250) and predetermined time X, extending from T2–X to T2+X. As shown in FIG. 7, it is possible for the two portions 800, 900 to overlap on the timeline 700, such that the beginning of user portion 900 occurs in between the beginning of luminary portion 800 and the end of luminary portion 800. The portions 800, 900 are stored as two separate portions 190 in the data 170. This allows the portions 800, 900 to be independent, so that any modifications made to one portion 800 will not impact the other portion 900, and vice versa. In at least one embodiment, separate video files are used to store these two portions 800, 900 in the data 170.

Modifications to Stored Portions

Returning to FIG. 2, it is seen that modifications can be made to a portion 190 using the portion modification programming 160. Modifications may be made by a participant only to the participant's own portions 190, so the portion 190 being modified must be first requested by the participant's computer 110, 120 during the stream. As explained above, once the portions 190 are created, they are stored in data 170. When the stream 20 has ended, the participants' computer systems 110, 120 are informed of any portions 190 that were created for them during the stream 20. In some embodiments, the portions 190 are not created by the server 100 until after termination of the stream 20. Once the portions 190 are created, user interfaces provided to those computers 110, 120 will allow the playback of a portion 190, the sharing of the portion 190 over social media sharing 125, or the modification of the portion 190. If the participant wishes to modify the portion 190, the portion modification programming 160 will receive modification instructions 260 from the user computer system 110 or similar instructions 262 from the luminary computer system 120. The modification programming 160 will then apply the requested modifications and create a modified version of the portion 192. The modified portion 192 is then stored with other portions 190 in the data 170.

As shown in FIG. 8, luminary portion 800 contains multiple visual segments 722, 732. In these types of embodiments, the requested modification to the portion 800 may reflect a user's choice as to how these different visual segments 722, 732 are integrated together when the portion 800 is either presented to the luminary computer 120 or shared to others (such as over the social media sharing site 125). For instance, the luminary may wish to have only the visual of the person currently speaking being presented in the visual playback of the portion 800, meaning that the displayed visuals will switch between visual segment 1.A 722 and visual segment 1B 732 depending on which person is speaking. Alternatively, even if there are more than two visual segments 722, 732 in the portion 800, the luminary may wish to only have themselves and one other person visually presented as part of the portion 800. This control of the visual presentation of the portion 800 can be saved as a modified version of portion 800 using portion modification programming 160 so that all future playbacks and sharing of the portion 800 will reflect the luminary's edits to this visual presentation.

Figure 9:
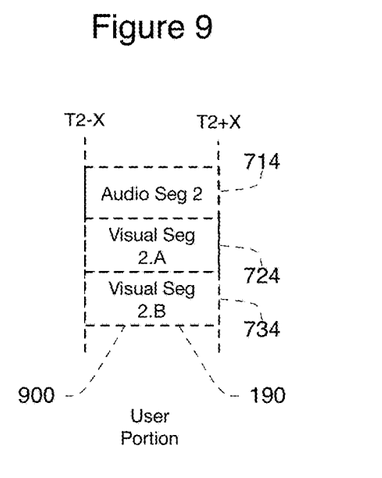
FIG. 9 is a schematic view of a fourth audio-visual portion.

In some embodiments, the portions 800, 900 are downloaded and shared as video files such as the MP4 containers discussed above. It is possible to store separate video tracks inside a video container. However, very few video players are actually designed to access these multiple video tracks or to switch seamlessly between these tracks. As a result, in most circumstances, it is preferable to store the multiple visual segments 722, 724, 732, 734 at the server 100. The user interfaces provided to the user computer system 110 and the luminary computer system 120 will then allow the participant to manipulate the multiple visual segments 722, 724, 732, 734 in order to create a preferred visual presentation. Once the preferred presentation is identified, the server 100 will then generate the portion 190 as a video file with a single visual track based upon the participant's modification instructions. In this type of embodiment, the originally creation portion 190 generated by the system server 100 after receiving signal 250 or 252 will also contain a single visual track, with the visual presentation being that which the participant was viewing during the stream 20, or some other presentation format that merges the different visual segments 722, 724, 732, 734 according to default or participant preference settings 176.

Figure 10:
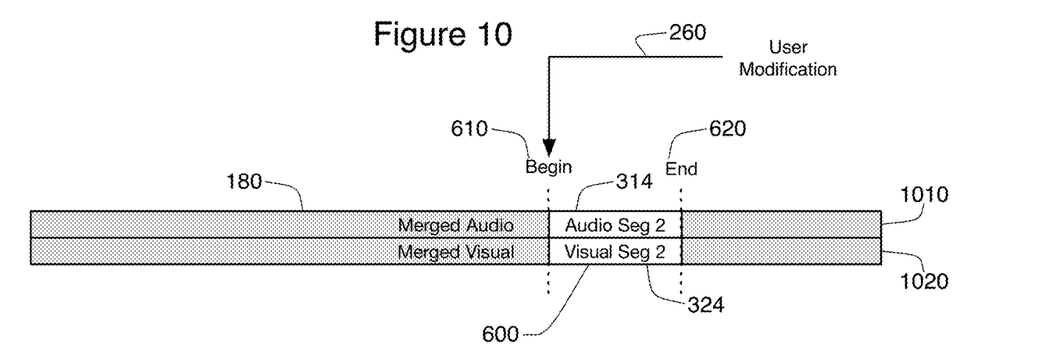
FIG. 10 is a schematic view illustrating the modification of the second audio-visual portion of FIG. 6.
Figure 11:
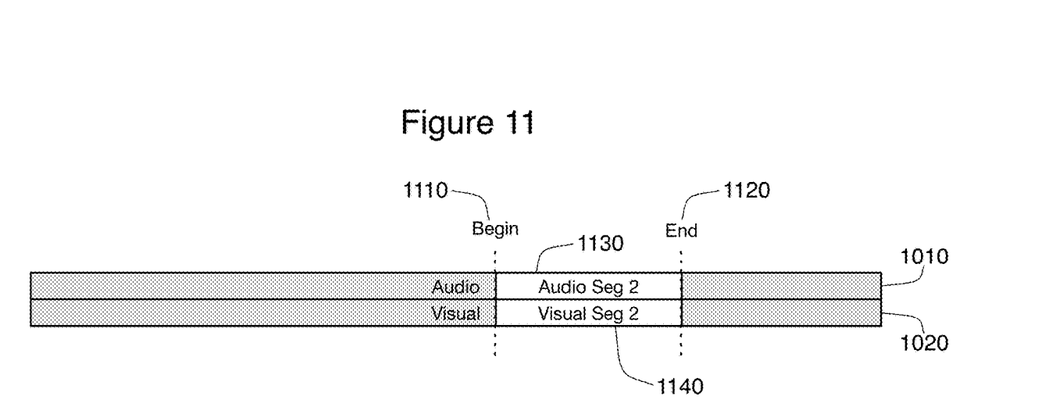
FIG. 11 is a schematic view of a modified second audio-visual portion in the context of the recorded communication of FIG. 3.
Figure 12:
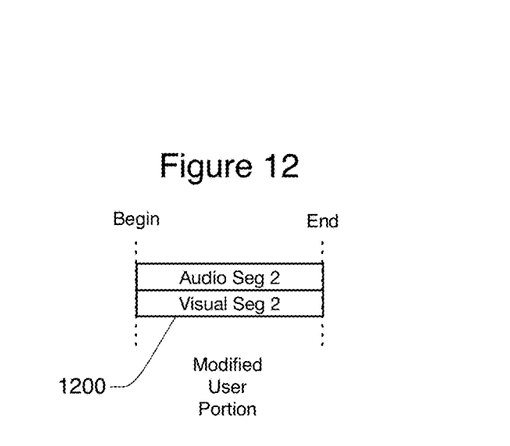
FIG. 12 is a schematic view of the modified second audio-visual portion.

FIG. 10 shows a different type of portion modification. In this case, a user modification signal 260 is being received to alter user portion 600. As shown in FIG. 6, user portion 600 originally extends from time T2-X 610 to time T2+X 620 because the request signal 250 was received at time T2 404. After the stream 20 is terminated, the user is able to change the beginning 610 and ending 620 times by submitting modification signal 260. The timeframe of the portion 600 can be changed because of the stored communication data 180 described above in connection with FIG. 3. To the extent the user wishes to move the beginning time before T2-X 610 or the ending time to after time T2+X, the necessary audio and video material can be acquired from the merged audio and visual components 1010, 1020 of the stored communication 180. As shown in FIG. 11, the user is able to modify portion so that it extends from new begin time 1110 until new end time 1120. By changing the beginning and ending times, a new audio segment 2 1130 and new visual segment 2 1140 are created. Together, these two segments 1130, 1140 create a modified user portion 1200 as shown in FIG. 12. Modifications of the begin and end times of a portion 190 can also be applied to embodiments where the portions contain multiple visual segments (such as portions 800, 900), as long as the stored communications file 180 also contains separate visual tracks from each of the participants.

As is suggested by FIGS. 10, 11, 12, some embodiments of system 10 may simply store the beginning 1110 and ending times 1120 of any segment 1200 and extract the necessary audio and visual data from the stored data 1010, 1020 in the whole stored communication data 180. When the participant requests the portion 1200 for sharing or playback, such an embodiment can simply create a new video file based on the data in the stored communication data 180 using the retained beginning time 1110 and ending time 1120. Other embodiments create and store the audio and visual contents of each portion 190 separately from the content of the stored communication 180. In particular, the portion 190 may be stored as a single audio-visual file encoded using a video codec, with each portion 190 being saved as a file separate from all other portions. The use of separate files speeds processing of viewing and sharing requests, as the stored video file that contains the stored portion 190 need only be accessed and then be immediately available to be played/shared/streamed/downloaded, as requested by the user or luminary computers 110, 120.

Method

Figure 13:
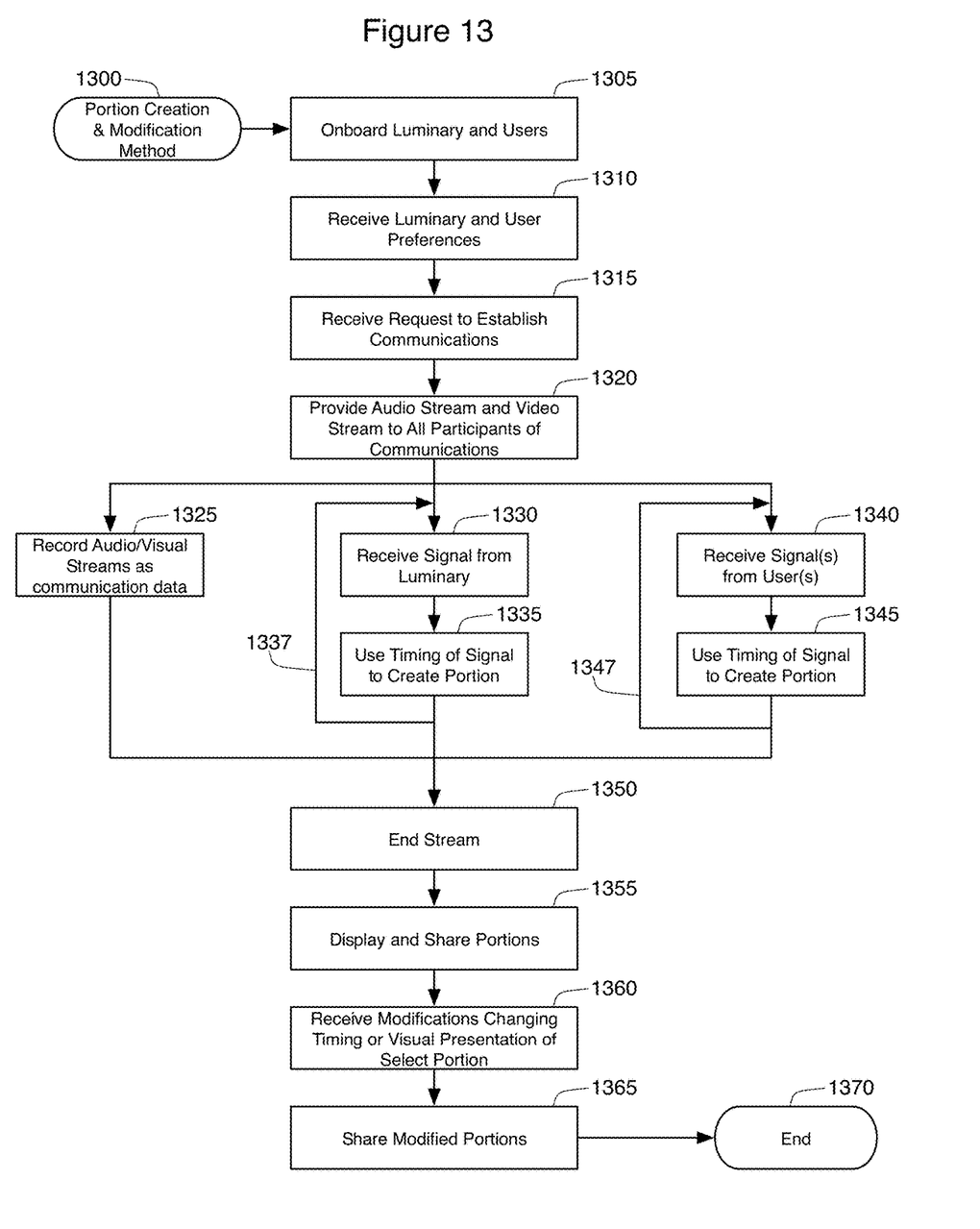
FIG. 13 is a flow chart showing a process of generating and modifying audio-visual portions of a multi-party video stream.

FIG. 13 is a flowchart showing a method 1300 for creating and sharing portions 190 in a multi-party audio-visual stream 20. The method begins at step 1305, in which luminary users on luminary computers 120 and users on user computers 110 are onboarded into the system 10. In this process, the luminaries and users establish accounts, and then provide user info 210 and rates and background info 212 into the system database 170. Preference data 220, 222 is then received and stored as data 176 in step 1310.

At step 1315, the connection programming 140 receives a request from the user computers 110 and/or the luminary computer 120 to establish the audio-visual stream 20 between a plurality of participants. The connection programming 140 establishes this connection by interacting with application programming on the participant computers 110, 120. The connection programming 140 then receives audio and visual data 240, 242 from the participant computers 110, 120 and creates the multi-party stream 20 at step 1320.

At this point, multiple processes can occur at once. At step 1325, the connection programming 140 records the audio and visual data 240, 242 that makes up the stream 20 as the communications data 180. As explained above, this can comprise storing the different data sources separately 240, 242, or can comprise creating a single video file containing some combination or aggregation of the received audio and visual data 240, 242.

At step 1330, the portion creation programming 150 can receive signal 252 from the luminary computer 120 indicating a desire to store a portion of the stream 20 for later review, sharing, and editing. The portion creation programming 150 then, at step 1335, creations the portion 190 based on the timing of the received signal 252. As explained above, one embodiment uses a predefined time period X, and starts the portion 190 at the received time minus X and ends the portion 190 at the received time plus X. Arrow 1337 indicates that the luminary computer 120 is able to submit multiple signals 252 in order to create multiple portions 190 in the same stream 20. Simultaneously, one or more of the user computers 110 can submit signals 250 at step 1340. These signals 250 also cause the portion creation programming 150 to create portions 190 for the user computers 110 at step 1345 based on the timing of these signals 250. At arrow 1347, it is clarified that multiple portions 190 can be created for each user computer 110, as well as separate portions 190 for the separate user computers 110 that are participating in the stream 20.

At step 1350, the connection programming 140 ends the stream 20. At this point, the system server 100 displays to each computer 110, 120 that participated in the stream 20 a list of the portions 190 that were created for that computer 110, 120. In some embodiments, the system server 100 also provides an opportunity for the participant to download the entire saved copy of the communication 180 in addition to presenting the bookmarks.

At step 1355, the users of these computers 110, 120 can display their saved portions 190 and can share the portions with other user computers 110, with the social media sharing site 125, or through other techniques. These other techniques might include downloading a video file containing the portion 190, or copying and sharing a URL link to the location of the portion 190 on a website maintained by the system server 100. When followed, this link can cause the system server 100 to present the linked-to stored portion 190 to the browser that presented the server 100 with the URL link.

At step 1360, either a user computer 110 or the luminary computer 120 can send modification instructions 260, 262, respectively to the portion modification programming 160. As explained above, the participants can amend one of their portions 190 by changing the beginning or ending time for the portion 190. To the extent they wish to extend the portion 190 either before the beginning or beyond the end, audio and video data from the stored communication data 180 can be utilized. Alternatively, or in addition, the participant may wish to change the visual presentation of the portion 190. In the context of a multi-party video conference stream 20, the change to the visual presentation may change the emphasis or size of the various video components provided by the different computers 110, 120 during the stream. The modified portions 192 can then be shared at step 1365 in the same manner as the original portions 190 were shared at step 1360. The method then ends at step 1370.

The many features and advantages of the invention are apparent from the above description. Numerous modifications and variations will readily occur to those skilled in the art. For example, an embodiment might allow a participant to create a new bookmark even after the stream 20 has ended at step 1350. This could be provided when the user selects to review the entire, saved communication 180. As part of playing back the communication 180 to the participant, an interface button could be provided to create a new portion 190 based on the currently being viewed portion of the communication 180. The created portion 190 could then be reviewed, downloaded, shared, and modified in the same manner as the portions 190 created during the stream 20. Since such modifications are possible, the invention is not to be limited to the exact construction and operation illustrated and described. Rather, the present invention should be limited only by the following claims.

What is claimed is:

1. A method for creating portions of an audio-visual stream comprising:
    a) at a system server, receiving audio data and visual data over a network from each of a plurality of computer systems;
    b) at the system server, using the received audio data and visual data to create the audio-visual stream;
    c) at the system server, transmitting the audio-visual stream over the network to the plurality of computer systems, wherein the audio-visual stream starts at a starting time and ends at a finishing time;
    d) at the system server, at a time T during the audio-visual stream, receiving from a first computer system a first signal;
    e) at the system server, after receiving the first signal, creating a first portion comprising a first video file containing audio data and visual data from the audio-visual stream having a portion timing that starts at a first begin time before time T and ends at a first end time after time T; and
    f) at the system server and after the finishing time of the audio-visual stream, presenting the first portion on a user interface of the first computer for playback.

2. The method of claim 1, wherein the first portion is created automatically after receiving the first signal from the first computer system without receiving any further signal related to the portion timing from the first computer system.

3. The method of claim 2, wherein the first begin time of the first portion is after the starting time of the audio-visual stream, and further wherein the first end time of the first portion is before the finishing time of the audio-visual stream.

4. The method of claim 2, wherein the step of creating the first portion occurs after the finishing time of the audio-visual stream.

5. The method of claim 2, wherein the first begin time of the first portion occurs at a predetermined time before time T and the first end time of the first portion occurs at the predetermined time after time T.

6. The method of claim 2, wherein the audio-visual stream contains separate visuals from the plurality of computer systems.

7. The method of claim 6, wherein the first portion combines the separate visuals into a single visual segment.

8. The method of claim 7, further comprising:
    g) at the system server, receiving a first modification signal from the first computer system after creating the first portion;
    h) at the system server, providing on the user interface an ability to arrange the separate visuals into a new visual segment for the first portion; and
    i) at the system server, creating a modified first portion as a new video file that contains the new visual segment.

9. The method of claim 6, wherein the first portion contains a separate visual segment for each of the separate visuals.

10. The method of claim 2, wherein the system server stores the audio-visual stream as a communication file, further comprising:
    g) at the system server, receiving a first modification signal from the first computer system after creating the first portion;
    h) at the system server, providing on the user interface an ability to alter the first begin time and the first end time; and
    i) at the system server, creating a modified first portion as a new video file that contains audio data and visual data taken from the communication file, the modified first portion having a modified portion timing extending from a modified begin time to a modified end time.

11. The method of claim 2, further comprising receiving, at the system server and at a time T2, a second signal from a second computer system; and creating a second portion comprising a second video file containing audio data and visual data from the audio-visual stream starting at a second begin time before time T2 and a second end time after time T2.

12. The method of claim 11, wherein the second portion overlaps the first portion such that the second begin time occurs after the first begin time and before the first end time.

13. The method of claim 2, wherein the first computer system is a luminary computer system operated by a luminary and a second computer system is operated by a user that paid compensation to participate in the audio-visual stream with the luminary.

14. A system comprising:
    a) a plurality of participant computer systems each having participant application programming and a participant computer processor that performs the participant application programming;
    b) a network;
    c) a system server in network communication with the plurality of participant computer systems over the network, the system server comprising:
        i) a server processor for operating server application programming, ii) connection programming in the server application programming that:
  (1) receives audio and visual data from each of the participant computer systems,
  (2) creates an audio-visual stream based on the received audio and visual data,
  (3) transmits the audio-visual stream to the plurality of participant computer systems over the network, wherein the audio-visual stream starts at a starting time and ends at a finishing time, and
  (4) creates a communication file containing the audio and visual data found in the audio-visual stream,
iii) portion creation programming in the server application programming that:
  (1) receives a first signal from a first computer system at a time T1 during the audio-visual stream;
  (2) after receiving the first signal from the first computer system, creates a first portion video file containing audio data and visual data from the audio-visual stream having a portion timing that starts at a first begin time before time T1 and ends at a first end time after time T1, wherein the first portion video file is created automatically after receiving the first signal from the first computer system without receiving any further signal related to the portion timing from the first computer system, and
  (3) transmits the first portion video file to the first computer system; and
iv) portion modification programming in the server application programming that:
  (1) receives a timing modification signal from the first computer system requesting modification of the portion timing of the first portion video file,
  (2) modifies at least one of the first begin time and the first end time creating a modified portion timing, and
  (3) generates a modified first portion video file using the modified portion timing.

15. The system of claim 14, wherein the plurality of participant computer systems comprises:
  i) a luminary computer system operated by a luminary, and
  ii) at least four user computer systems operated by users that desired to participate in the audio-visual stream with the luminary.

16. The system of claim 14, wherein the portion creation programming creates the first portion video file after a finishing time of the audio-visual stream.

17. The system of claim 14, wherein the audio-visual stream contains separate visuals from the plurality of participant computer systems, and wherein the portion modification programming further:
  (4) receives a visual modification signal requesting modification of the visuals of the first portion video file,
  (5) modifies the visuals within the first portion video file, and
  (6) generates a second modified first portion video file using the modified visuals.

18. The system of claim 14, where the portion modification programming further receives, at time T2, a second signal from a second computer system; and creates a second portion video file containing audio data and visual data from the audio-visual stream starting at a second begin time before time T2 and a second end time after time T2.

19. The system of claim 18, wherein the second begin time occurs after the first begin time and before the first end time.

20. The system of claim 14, wherein the system server comprises a plurality of separate computer systems each having their own processors wherein the server application programming on each separate computer systems operates in concert to form the system server.

* * * * *